(12) United States Patent
Rafi et al.

(10) Patent No.: US 11,768,794 B1
(45) Date of Patent: Sep. 26, 2023

(54) INTERFACE BETWEEN PROCESSING UNIT AND AN EXTERNAL NONVOLATILE MEMORY

(71) Applicant: Silicon Laboratories Inc., Austin, TX (US)

(72) Inventors: Aslam Rafi, Austin, TX (US); Thomas Saroshan David, Lakeway, TX (US); Daniel Cooley, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/700,907

(22) Filed: Mar. 22, 2022

(51) Int. Cl.
*G06F 13/40* (2006.01)
*G06F 1/12* (2006.01)

(52) U.S. Cl.
CPC ............ *G06F 13/4068* (2013.01); *G06F 1/12* (2013.01)

(58) Field of Classification Search
CPC ................................ G06F 13/4068; G06F 1/12
See application file for complete search history.

(56) References Cited

U.S. PATENT DOCUMENTS

| | | | | |
|---|---|---|---|---|
| 5,572,157 A * | 11/1996 | Takashi | ................... | H03L 7/093 327/156 |
| 11,165,718 B2 * | 11/2021 | Lo | ........................... | H04L 49/20 |
| 2009/0235218 A1 * | 9/2009 | Wahl | ........................ | G06F 1/12 716/113 |
| 2012/0039426 A1 * | 2/2012 | Onodera | ................. | H04L 7/033 375/355 |
| 2014/0362952 A1 * | 12/2014 | Cheng | ..................... | H04L 27/12 375/303 |
| 2021/0326292 A1 * | 10/2021 | Yeh | ..................... | G06F 13/4072 |

FOREIGN PATENT DOCUMENTS

DE 19714467 A1 * 10/1998 ............... G06F 1/12

OTHER PUBLICATIONS

Sonntag et al., "A Digital Clock and Data Recovery Architecture for Multi-Gigabit/s Binary Links", IEEE Journal of Solid-State Circuits, vol. 41, No. 8, pp. 1867-1875, Aug. 2006.
Yin et al., "A TDC-Less 7 mW 2.5 GB/s Digital CDR With Linear Loop Dynamics and Offset-Free Data Recovery", IEEE Journal of Solid-State Circuits, vol. 46, No. 12, pp. 3163-3173, Dec. 2011.

* cited by examiner

*Primary Examiner* — Idriss N Alrobaye
*Assistant Examiner* — Ronald T Modo
(74) *Attorney, Agent, or Firm* — NIELDS, LEMACK & FRAME, LLC

(57) ABSTRACT

An interface between two devices is disclosed. To consume power, the signals used in the interface utilize CMOS signalling. Further, to achieve high speed, a reduced frequency clock is transmitted from one device to the second device. The second device has a clock multiplier to recreate the original clock. Both devices utilize a clock phase alignment block which aligns the phase of the clock with the incoming data. The clock phase alignment block utilizes a digital PLL to consume power. Further, since the digital PLL retains its state, the reduced frequency clock may be disabled when data is not being transmitted. This interface may be used to transmit serial data at rates up to and exceeding 2.5 Gbits/sec.

19 Claims, 6 Drawing Sheets

INTERFACE BETWEEN PROCESSING UNIT AND AN EXTERNAL NONVOLATILE MEMORY

FIELD

This disclosure describes a low power, high speed interface between two devices, such as a processing device and an external nonvolatile memory device.

BACKGROUND

System on Chip (SoC) and other similar devices are created by disposing a processing unit, its instructions and other functions within a single die. In some cases, the processing unit may be an ARM-based processor, although other processors may be used. Further, in some embodiments, the instructions are disposed within a rewritable nonvolatile memory (NVM), such as a FLASH memory.

However, the scaling of NVM has lagged transistor scaling. For example, transistor scaling has reached 22 nm and is projected to shrink to smaller geometries. In contrast, NVM technology is currently limited to 40 nm or larger geometries. This leaves system designers with a dilemma. The SoC may be manufactured using an older technology to allow the incorporation of FLASH memory. However, this approach limits the number of transistors in the device and also results in higher power consumption.

Alternatively, the SoC may be made using the most recent technology. In this embodiment, the designer may opt to use a ROM based architecture, which does not allow upgrades of the software at a later date. Alternatively, newer NVM technologies, such as ReRAM or MRAM, may be utilized. However, these memory technologies are not yet mature. Yet another alternative is to utilize external nonvolatile memory.

Existing external nonvolatile memories utilize a Serial Peripheral Interface (SPI) interface. Unfortunately, these memories have slow access times. For example, it may take over 64 CPU cycles to fill a 4-word cache line at single data rate (SDR). Furthermore, the interface to these external nonvolatile memories operates at 1.8V, which consumes power.

Therefore, it would be beneficial if there were an interface between the main processing unit and the external nonvolatile memory that was low power and also very high speed. Further, it would be advantageous if this interface had low latency and could tolerate periods where the clock is disabled.

SUMMARY

An interface between two devices is disclosed. To consume power, the signals used in the interface utilize CMOS signalling. Further, to achieve high speed, a reduced frequency clock is transmitted from one device to the second device. The second device has a clock multiplier to recreate the original clock. Both devices utilize a clock phase alignment block which aligns the phase of the clock with the incoming data. The clock phase alignment block utilizes a digital PLL to consume power. Further, since the digital PLL retains its state, the reduced frequency clock may be disabled when data is not being transmitted. This interface may be used to transmit serial data at rates up to and exceeding 2.5 Gbits/sec.

According to one embodiment, a system for providing a high speed interface between two devices in disclosed. The system comprises a first device having an outgoing data signal, wherein the outgoing data is transmitted using a serdes clock, wherein the first device provides a reduced frequency clock, wherein a frequency of the reduced frequency clock is equal to a frequency of the serdes clock divided by an integer; a second device to receive the outgoing data signal and the reduced frequency clock from the first device; wherein the second device comprises a multiplier in communication with the reduced frequency clock to create a memory serdes clock having a frequency equal to the frequency of the serdes clock; a data buffer to receive the outgoing data signal and create an incoming data signal; a clock phase alignment block, which utilizes a digital PLL to align a phase of the memory serdes clock with the incoming data signal; and a serial to parallel converter which clocks the incoming data signal using the memory serdes clock that has been phase aligned. In some embodiments, the first device comprises a data input buffer to receive a data signal from the second device and create a received data signal; a second clock phase alignment block, which utilizes a second digital PLL to align a phase of the serdes clock with the received data signal; and a second serial to parallel converter which clocks the received data signal using the serdes clock that has been phase aligned. In some embodiments, the outgoing data signal and the reduced frequency clock comprise single-ended CMOS signals. In certain embodiments, the integer is 2; and the multiplier utilizes combinational logic to create the memory serdes clock. In some embodiments, the frequency of the serdes clock is greater than 1 GHz. In some embodiments, the digital PLL has a high gain mode and a lower gain mode. In certain embodiments, the high gain mode is used to acquire lock and has a duration equal to a predetermined number of transitions of the incoming data signal. In some embodiments, the clock phase alignment block comprises a delay line having the memory serdes clock as an input and having a plurality of outputs of different delays, and a sampler, wherein the plurality of outputs are clocked into the sampler by a transition of the incoming data signal. In certain embodiments, a delay through the delay line is greater than or equal to two periods of the memory serdes clock, such that the sampler captures at least two rising edges of the memory serdes clock. In certain embodiments, locations of the at least two rising edges of the memory serdes clock within the sampler are used as inputs to the digital PLL.

According to another embodiment, a device is disclosed. The device an interface having a data signal and a reduced frequency clock, wherein the data signal has a frequency that is a multiple of the reduced frequency clock; a multiplier in communication with the reduced frequency clock to create a memory serdes clock having a frequency equal to a frequency of the data signal; a data buffer to receive the data signal and create an incoming data signal; a clock phase alignment block, which utilizes a digital PLL to align a phase of the memory serdes clock with the incoming data signal; and a serial to parallel converter which clocks the incoming data signal using the memory serdes clock that has been phase aligned. In some embodiments, the digital PLL has a high gain mode and a lower gain mode. In certain embodiments, the high gain mode is used to acquire lock and has a duration equal to a predetermined number of transitions of the incoming data signal. In some embodiments, the clock phase alignment block comprises a delay line having the memory serdes clock as an input and having a plurality of outputs of different delays, and a sampler, wherein the plurality of outputs are clocked into the sampler by a transition of the incoming data signal. In certain embodiments, a delay through the delay line is greater than or equal to two periods of the memory serdes clock, such that the sampler captures at least two rising edges of the memory serdes clock. In certain embodiments, locations of the at least two rising edges of the memory serdes clock within the sampler are used as inputs to the digital PLL. In certain embodiments, the multiple is 2; and the multiplier utilizes combinational logic to create the memory serdes clock. In some embodiments, the data signal and the reduced frequency clock comprise single-ended CMOS signals. In some embodiments, the frequency of the reduced frequency clock is greater than 1 GHz.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
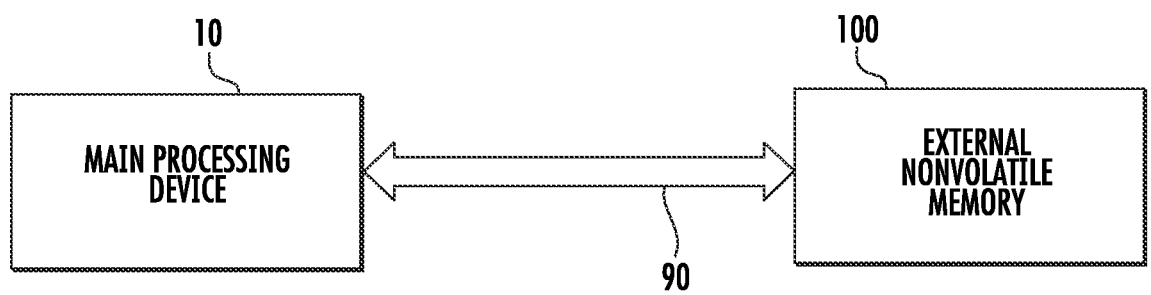
FIG. 1 shows a main processing device and an associated external nonvolatile memory.

FIG. 1 shows a block diagram with a main processing device 10 and an associated external nonvolatile memory device 100. The main processing device 10 may include an embedded processing unit and a cache memory. In certain embodiments, the main processing device 10 may be fabricated using 22 nm technology. In some embodiments, a smaller geometry may be used. This choice allows a maximum number of transistors, while minimizing power consumption.

The external nonvolatile memory device 100 may be fabricated using an older technology, such as 40 nm or 90 nm. These technologies are better adapted to nonvolatile memories, such as FLASH memories.

Additionally, an interface 90, also referred to as the serdes interface, may be used to communicate between the two devices. The interface 90 may include one or more data signals. Additionally, the interface 90 may include a clock signal. The use of a clock signal enables higher speed communication between the devices, as clock reconstruction is not required. The interface 90 may utilize single ended CMOS signals, which consumes more power in the active mode and much lesser power in the standby mode than LVDS (low voltage differential signaling) type of signaling. For systems in which the time spent in standby mode is much more than the time spent in the active mode, total energy consumed (Energy=Power*Time spent) is reduced by using CMOS signaling.

In addition to the data signals and a clock signal, the interface 90 may comprise other signals as well. For example, in certain embodiments, the main processing device 10 may supply power to the external nonvolatile memory device 100. In this way, the external nonvolatile memory device 100 may take advantage of the DC-to-DC converter resident in the main processing device 10. In certain embodiments, the interface 90 may include a reset signal. In certain embodiments, the interface 90 may include an interrupt (IRQ) signal.

Figure 2:
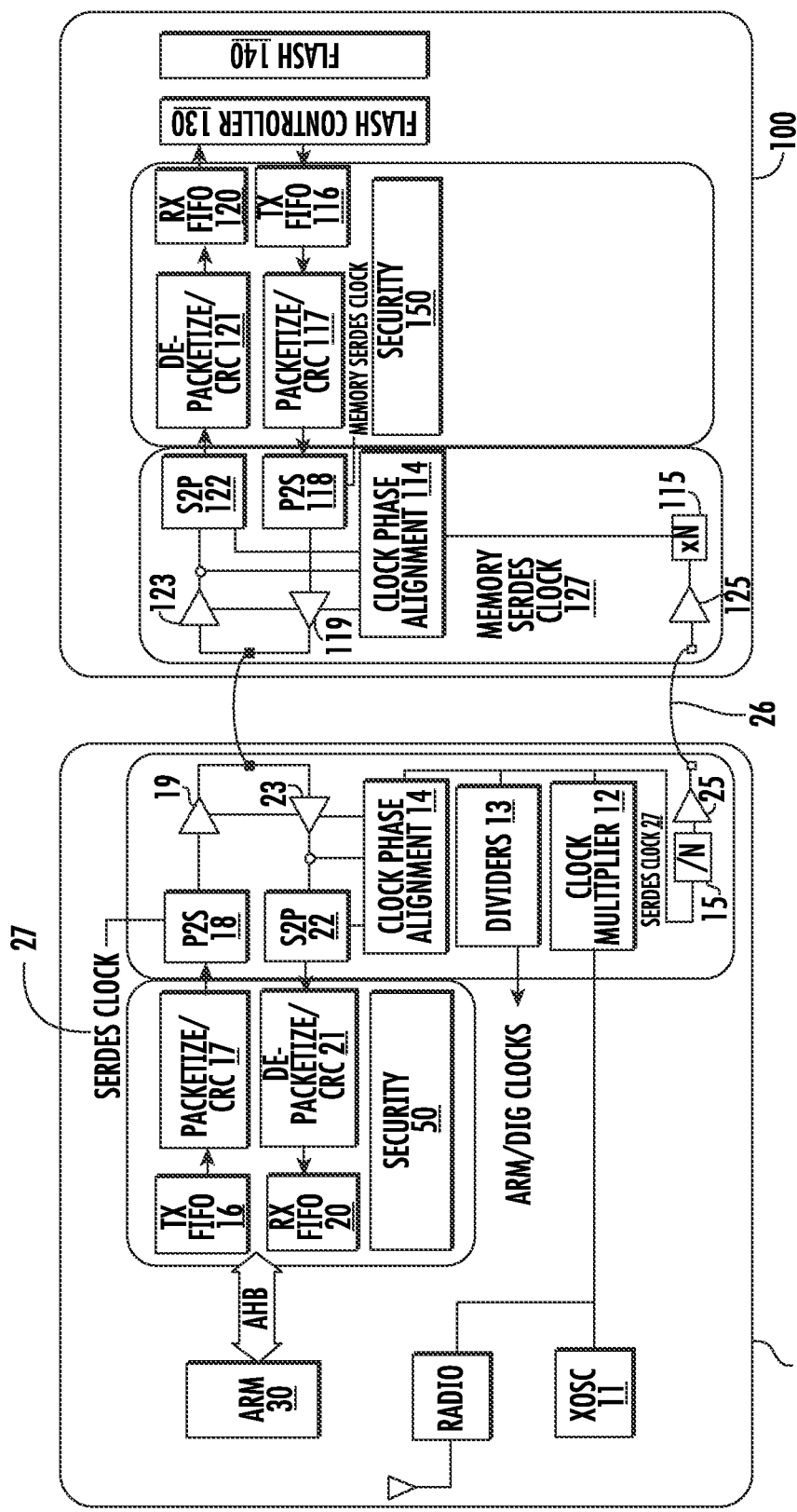
FIG. 2 is a block diagram of the interface between the main processing device and the associated external nonvolatile memory.

FIG. 2 shows a block diagram of the interface between the main processing device 10 and the external nonvolatile memory device 100. Each block within the main processing device 10 and within the external nonvolatile memory device 100 may be an integrated circuit comprising a plurality of transistors configured to perform the described operation or function.

The main processing device 10 includes an external oscillator 11, which may be a crystal. This external oscillator 11 is in communication with a clock multiplier 12, which multiplies the clock signal from the external oscillator 11 to obtain higher frequency signals. One output of the clock multiplier 12, referred to as the serdes clock 27, may be in excess of 1 GHz. In certain embodiments, the serdes clock 27 may be in excess of 2 GHz, such as 2.4 GHz or more. The serdes clock 27 may then be provided as an input to the clock divider 13, which divides the high frequency clock for use within other blocks of the main processing device 10, such as generating the clock for the processing unit 30, which may be an ARM processor.

The serdes clock 27 is also provided to a divider 15, which divides the high frequency clock by an integer (N). This reduction in frequency of the serdes clock 27 reduces the power consumption of clock driver 25. In some embodiments, N may be 2. The reduced frequency clock 26 is then transmitted to the external nonvolatile memory device 100 using clock driver 25.

The serdes clock 27 is also provided to a clock phase alignment block 14. This block is used to align the phase of the clock used by the serial-to-parallel (S2P) converter 22 to the incoming data from the external nonvolatile memory device 100.

The main processing device 10 also includes an incoming and outgoing data path.

The outgoing data path comprises a transmit FIFO 16, and a packetizer 17 to create packets from the data that is to be transmitted. The packets may contain commands, data and other control information. The output of the packetizer 17 is then provided to a parallel-to-serial (P2S) converter 18. The P2S converter 18 may be clocked using the serdes clock 27. The output from the P2S converter 18, which is a serial bit stream, is then provided to the data output buffer 19.

The incoming data path comprises a data input buffer 23. The output from the data input buffer 23, which is referred to as the received data signal, is provided to a serial-to-parallel (S2P) converter 22. The S2P converter 22 is clocked by the output of the clock phase alignment block 14, which centers each incoming data bit about a rising clock edge. The output of the S2P converter 22, which is parallel data, is used by the depacketizer 21 to extract the necessary information from the incoming data, which is in the form of a packet. The output of the depacketizer 21 is then provided to the receive FIFO 20.

The external nonvolatile memory device 100 is configured to interface with the main processing device 10. As such, it comprises a multiplier 115, which receives the reduced frequency clock 26 transmitted by clock driver 25. The multiplier 115 multiplies the received clock by the same factor which it was divided by in the divider 15. In this way, the output of the multiplier 115, which is referred to as the memory serdes clock 127, is the same frequency as the serdes clock 27.

The external nonvolatile memory device 100 also includes an incoming and outgoing data path.

The outgoing data path comprises a transmit FIFO 116, and a packetizer 117 to create packets from the data that is to be transmitted. The output of the packetizer 117 is then provided to a parallel-to-serial (P2S) converter 118. The P2S converter 118 may be clocked using the memory serdes clock 127. The output from the P2S converter 118 is then provided to the data output buffer 119.

The incoming data path comprises a data input buffer 123. The output from the data input buffer 123, which is referred to as the incoming data signal, is provided to a serial-to-parallel (S2P) converter 122. The S2P converter 122 is clocked by the output of the clock phase alignment block 114, which centers the incoming data bit about the rising clock edge. The output of the S2P converter 122 is used by the depacketizer 121 to extract the necessary information from the incoming data. The output of the depacketizer 121 is then provided to the receive FIFO 120.

The transmit and receive FIFOs are in communication with a nonvolatile memory (NVM) controller 130, which is responsible for providing addresses to the nonvolatile memory 140, which may be a FLASH memory or other rewritable nonvolatile memory. The data is stored in the nonvolatile memory 140.

Additionally, security and error correction may be included in the data paths. For example, the packetizers may include a cyclic redundancy code (CRC) to the packet prior to transmission. Similarly, the depacketizers may utilize the CRC that was appended by the packetizers to validate that there are no data transmission errors.

Further, additional security features may be incorporated into the main processing device 10 and the external nonvolatile memory device 100. For example, a security module 50 may be incorporated into the main processing device 10 and a security module 150 may also be incorporated into the external nonvolatile memory device 100. In certain embodiments, the security modules may be used to encrypt the data that is being transmitted. For example, a Galois/Counter Mode (GCM) algorithm may be used to encrypt the data. Of course, other algorithms may also be used. While the security modules are shown as separate blocks, it is understood that these modules interact with the respective incoming and outgoing data paths.

In certain embodiments, there may be separate external connections for the outgoing data (i.e., data transmitted from the main processing device 10 to the external nonvolatile memory device 100) and for the incoming data (i.e., data transmitted from the external nonvolatile memory device 100 to the main processing device 10). Thus, in this mode, there are two (or more) unidirectional data signals between the main processing device 10 and the external nonvolatile memory device 100. Further, in this mode, the output of the data output buffer 19 is not connected to the input of the data input buffer 23, and the output of the data output buffer 119 is not connected to the input of the data input buffer 123.

In other embodiments, such as that shown in FIG. 2, to minimize external connections, the data signal may be bidirectional, operating in half-duplex mode. In this embodiment, the output of the data output buffer 19 and the input of the data input buffer 23 are connected to a single external connection. Similarly, the output of the data output buffer 119 and the input of the data input buffer 123 are connected to a single external connection. Further, these two external connections may be connected using bond-wires in a multi-chip module. In another embodiment, the two die are assembled in a flip-chip package where the routing between main processing device 10 and external nonvolatile memory device 100 is achieved using traces in the substrate of the flip chip package. In another embodiment, the main processing device 10 and external nonvolatile memory device 100 are individually packaged and the connections between them are implemented as traces on a printed circuit board.

Half-duplex communications are configured such that all communications are initiated by the main processing device 10. In other words, the external nonvolatile memory device 100 never initiates a communication with the main processing device 10. Rather, it only responds to communications initiated by the main processing device 10.

To operate properly, it is important that the incoming data be clocked at the appropriate time, when the data bit is stable. Specifically, the main processing device 10 transmits a data bit at each positive transition of the serdes clock 27. These data bits are received by the external nonvolatile memory device 100 and must be sampled by the S2P converter 122 when the data bit is stable. Specifically, if the data is updated by the main processing device 10 at each rising edge of the serdes clock 27, the data bit is preferably sampled in a window that is between two adjacent rising edges of the serdes clock. For example, the window may be a predetermined duration of time that is centered about the midpoint between two adjacent rising edges of the serdes clock 27.

However, as noted above, the serdes clock 27 is not transmitted to the external nonvolatile memory device 100. Rather, the serdes clock 27 is divided by an integer using divider 15 and this reduced frequency clock 26 is transmitted to the external nonvolatile memory device 100. This reduced frequency clock 26 may have frequency greater than 1 GHz. In certain embodiments, the divider 15 divides the serdes clock 27 by 2. Thus, after the reduced frequency clock 26 is received by the external nonvolatile memory device 100, it is multiplied back to the original frequency (i.e. the frequency of the serdes clock 27) using multiplier 115. In the embodiment where the reduced frequency clock 26 is half the frequency of the serdes clock 27, the multiplier 115 may be a digital circuit. In other words, an analog phase locked loop (PLL) is not needed to generate the memory serdes clock 127. This may be important since analog PLLs consume more power and also may require a continuous clock signal to remain locked. In contrast, the multiplier 115 uses only digital circuitry and does not require the reduced frequency clock 26 to be continuously active.

Note that the system is not limited to a reduced frequency clock 26 that is half the frequency of the serdes clock 27.

Figure 3:
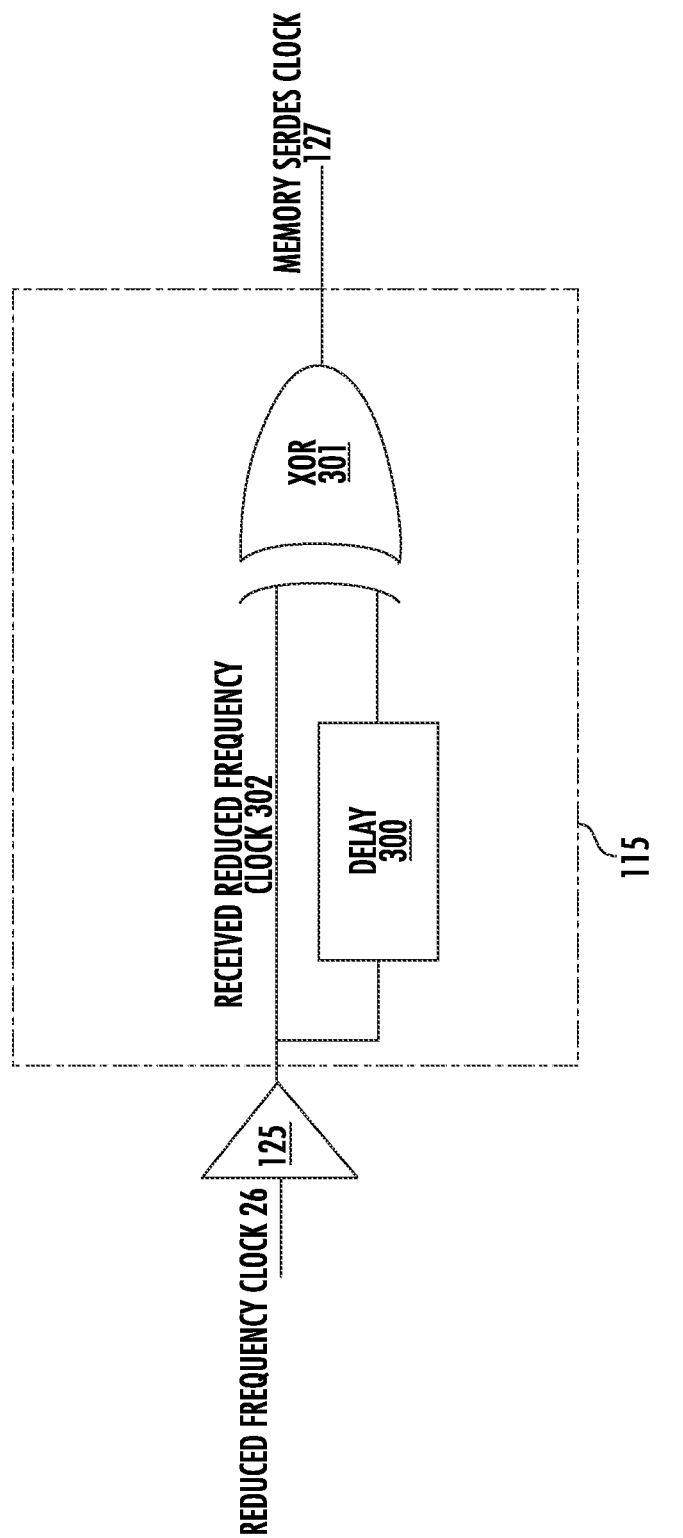
FIG. 3 shows a block diagram of a clock multiplier.

FIG. 3 shows one embodiment of a multiplier 115. In this embodiment, the reduced frequency clock 26 is received by the clock input buffer 125. The output of the clock input buffer 125, referred to as received reduced frequency clock 302, may be used to supply the input to a delay circuit 300. In one embodiment, the delay circuit 300 may be a plurality of serially arranged inverters. The number of inverters is not defined by this disclosure. Rather, the delay circuit 300 is intended to create a delayed version of the received reduced frequency clock 302. This delay may be between 10% and 50% of the period of the received reduced frequency clock 302. Thus, as an example, if the received reduced frequency clock 302 is 1.25 GHz and has a period of 800 picoseconds, the delay may be between 80 and 400 picoseconds.

The received reduced frequency clock 302 and the output of the delay circuit 300 are provided as inputs to an XOR gate. The output of the XOR gate 301 is the memory serdes clock 127, which is asserted whenever the two inputs to the XOR gate 301 are different. Thus, when the received reduced frequency clock 302 transitions from low to high or from high to low, the output of XOR gate 301 is asserted. That assertion has a duration roughly equal to the delay introduced by the delay circuit 300. Because there are two transitions of the received reduced frequency clock 302 per period, the memory serdes clock 127 has a frequency that is twice that of the received reduced frequency clock 302. Note that the multiplier 115 does not utilize an analog voltage controlled oscillator (VCO) or any other analog components; rather, the multiplier 115 is made using only combinational logic.

Note that, however, there is no define phase relationship between the serdes clock 27 and the memory serdes clock 127. Indeed, there are a number of components that are in the path between the serdes clock 27 and the memory serdes clock 127. With process and temperature variations, it is not possible to predict an exact phase relationship between these clocks.

Figure 4:
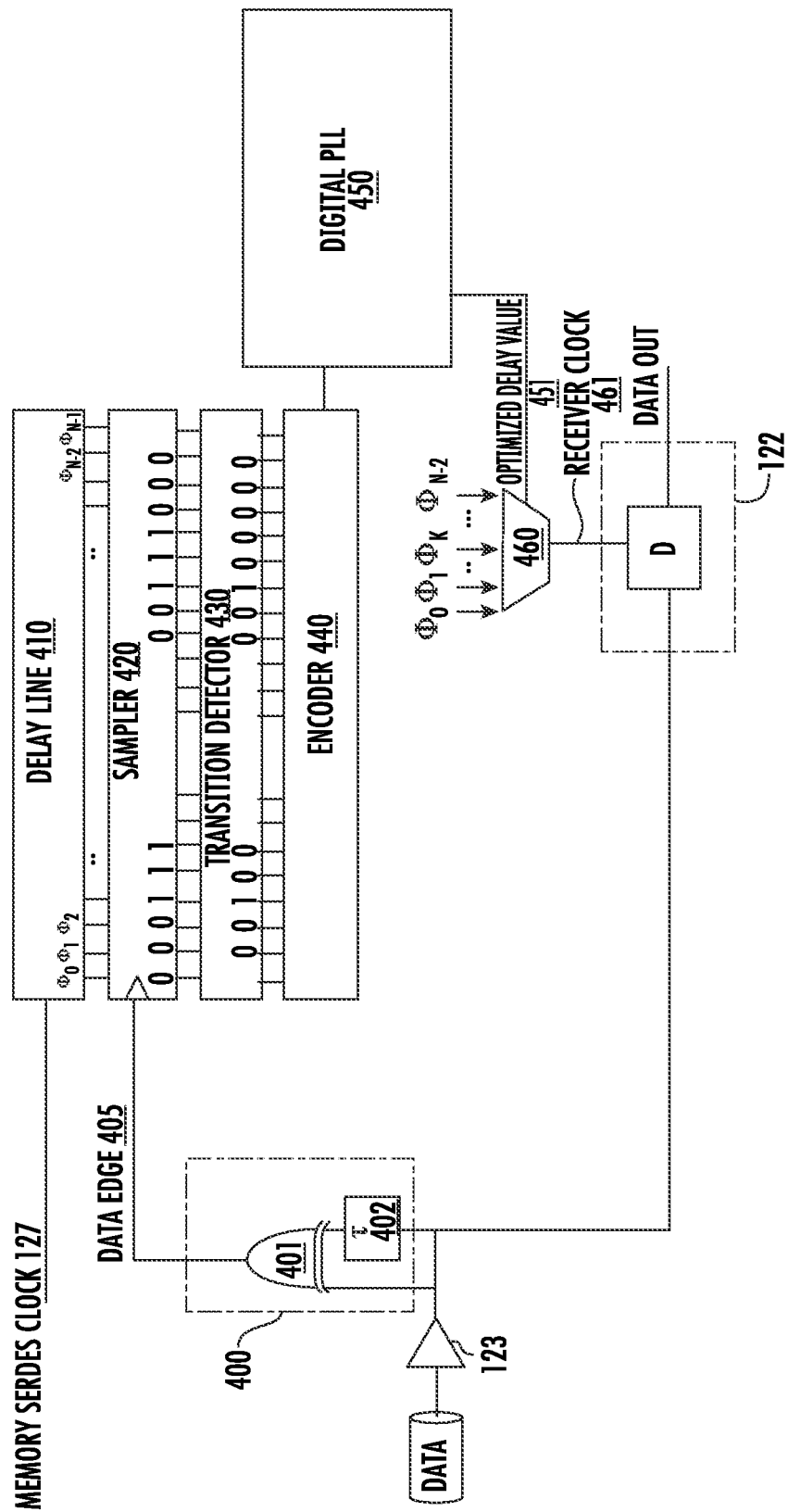
FIG. 4 shows a block diagram of the clock phase alignment block.

Consequently, each device includes a clock phase alignment block. FIG. 4 shows a block diagram of this block. While the following description describes the clock phase alignment block 114 in the external nonvolatile memory device 100, it is understood that the same circuit may be used for the main processing device 10.

The incoming data is received by data input buffer 123. The output of the data input buffer 123 is then provided as an input to a data transition detector 400 and to the S2P converter 122. The data transition detector 400 operates in a similar fashion to the multiplier 115 described in FIG. 3 and comprises a delay circuit 402 and an XOR gate 401. The output of the data transition detector 400, referred to as data edge 405, is a short pulse asserted whenever the state of the data bit changes. As described above, the width of the pulse may be roughly equal to the delay introduced by the delay circuit 402.

The memory serdes clock 127 is provided as the input to a delay line 410. The delay line 410 may be constructed from a plurality of inverters that are serially arranged. The delay lines 410 has a plurality of outputs ($\varphi_0$ through $\varphi_{N-1}$), each of which is delayed from the previous output. In one embodiment, the delay line 410 has 2*N inverters and an output is provided after each pair of inverters such that there are N outputs. The delay line 410 is configured such that the delay from the start of the delay line 410 to the last output of the delay line is greater than or equal to two periods of the memory serdes clock 127. In other words, the difference in time between the memory serdes clock 127 and the output $\varphi_{N-1}$ is at least twice the period of the memory serdes clock 127. Further, the delay line 410 may a plurality of outputs or taps, such that each output is delayed from the start of the delay line 410 by a different amount. For example, if the memory serdes clock 127 has a frequency of 2.5 GHz and a period of 400 picoseconds, the delay through the delay line 410 may be at least 800 picoseconds. Further, there may be N outputs ($\varphi_0$ through $\varphi_{N-1}$), where each is delayed from the previous output by roughly 800 picoseconds/N. Thus, if there are 40 outputs from the delay line 410, each may be delayed by roughly 20 picoseconds from the previous output. Note that the delay between adjacent outputs may not be constant due to routing and process variations.

Because the delay through the delay line 410 is at least twice the period of the memory serdes clock 127, the outputs ($\varphi_0$ through $\varphi_{N-1}$) of the delay line 410 will always include at least two rising edges of the memory serdes clock 127.

The sampler 420 comprise a plurality of storage elements, which may be flip flops. The number of storage element may be equal to the number of outputs from the delay line 410. In this way, each output from the delay line 410 is in communication with the input to a respective storage element disposed in the sampler 420. These storage elements are clocked using the data edge 405. In this way, when the data bit transitions to a different state, the outputs of the delay line 410 at that time are captured by the sampler 420. Thus, when the data bit transition from high to low or low to high, the outputs ($\varphi_0$ through $\varphi_{N-1}$) are stored in the sampler 420.

The outputs from the sampler 420 are the outputs of each of the plurality of storage elements. These outputs reflect the states of the memory serdes clock 127 over the time interval prior to the transition of the data bit, where the time interval is equal to the delay through the delay line 410.

As noted above, since the delay through the delay line 410 is at least twice the period of the memory serdes clock 127, there will be at least two rising edges of the memory serdes clock 127 that are captured by the sampler 420.

The outputs of the sampler 420, which represent the respective outputs from each of the plurality of storage elements, are provided to the transition detector 430. The transition detector 430 is used to identify the locations at which the outputs from the sampler 420 switch from low to high. In other words, if the $(N-1)^{th}$ output from the sampler 420 is a 0 and the $N^{th}$ output is a 1, then a positive transition is detected. In certain embodiments, the transition detector 430 comprises a plurality of AND gates, where each AND gate receives as inputs the inverse of an output from the sampler 420 and the adjacent output. Thus, each respective AND gate receives as inputs $-\varphi_k$ and $\varphi_{k+1}$, where k varies from 0 to N−2. Thus, there is one less AND gate than there are outputs from the sampler 420. The output of each AND gate is only asserted if the first input is deasserted while the second input is asserted.

Because of the length of the delay line 410, the sampler 420 and the transition detector 430, the output from the transition detector 430 comprises 2 bits that are set to 1 while the remaining bits are all set to 0. These two asserted bits represent the two rising edges of the memory serdes clock 127.

The output from the transition detector 430 is then supplied to the encoder 440. The encoder 440 accepted the N−1 inputs from the transition detector and converts the incoming string into one or more values. In one embodiment, the outputs of the encoder 440 are the location of each rising edge. Thus, in this embodiment, there are two outputs from the encoder 440; a first rising edge location and a second rising edge location.

Thus, data transition detector 400, delay line 410, sampler 420, transition detector 430 and the encoder 440 are configured to determine the temporal relationship between the memory serdes clock 127 and the incoming data. In some embodiments, the output from the encoder 440 comprises two values that correspond to the positions of the previous two rising edges of the memory serdes clock 127 with respect to a data bit transition.

Figure 5:
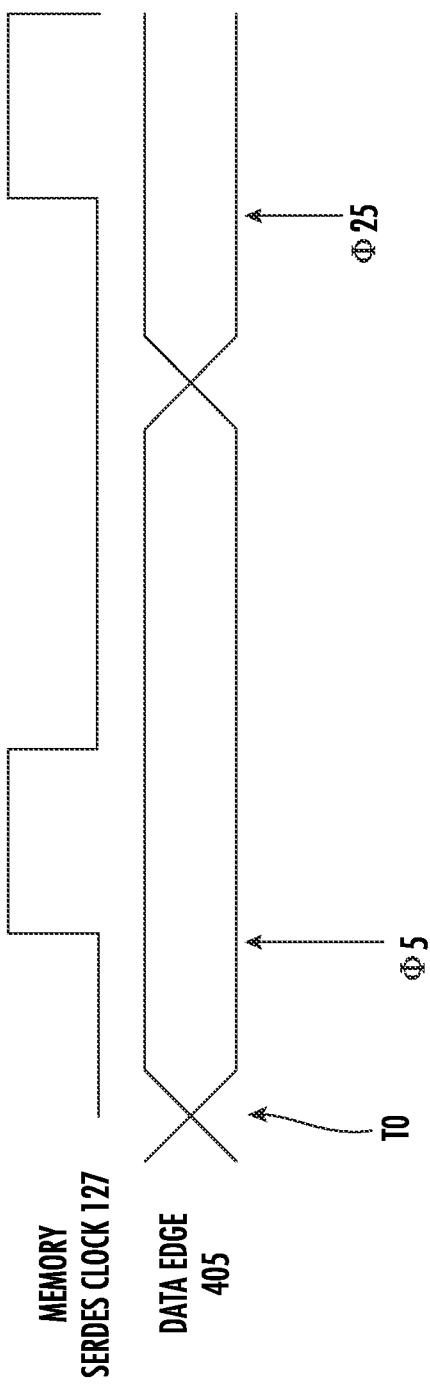
FIG. 5 shows the operation of the clock phase alignment block.

As an example, assume that the delay line 410 has 40 outputs. Also assume that, as shown in FIG. 5, when the data bit transitions at time T0, a rising edge of the memory serdes clock 127 is detected at outputs $\varphi_5$ and $\varphi_{25}$. Assume as well that the average delay between adjacent outputs is 20 picoseconds. In other words, based on this information, it can be seen that the last two rising edges of the memory serdes clock 127 occurred 100 picoseconds and 500 picoseconds before the data transition. It is desirable to have the data bit stable prior to sampling it. Therefore, it may desirable to use a delayed version of the memory serdes clock 127 that is midway between the two rising edges. In this way, the time between one data bit transition and the rising edge of this delayed version of the clock may be roughly the same as the time between the rising edge of this delayed version of the clock and the next data bit transition. In other words, this delayed clock may be in the middle of the window during which the data bit is stable. If the two values (i.e. 5 and 25) are averaged, the result is 15. Thus, the delayed version of the memory serdes clock 127 that is output as the fifteenth output of the delay line 410 may be used to clock the incoming data. Note that the fifteen output of the delay line will be asserted about 200 picoseconds after the transition of the data, since it is 10 outputs (i.e. 10 delays of about 20 picoseconds each) after the fifth output, which is currently asserted.

Further, in one embodiment, the output or outputs from the encoder 440 are provided to a digital PLL. The digital PLL acts like a low pass filter and is used to smooth the jitter caused by intersymbol interference (ISI). Thus, the current output of the encoder 440 is combined in some way with the previous values that are stored or accumulated by the digital PLL 450 to produce a new value. This new value may be referred to as the optimized delay value 451.

The optimized delay value 451 is then used as the select inputs to a multiplexer 460, which selects one of the outputs ($\varphi_0$ through $\varphi_{N-1}$) from the delay line 410 to use as the clock for the incoming data. This output from the multiplexer 460 may be referred to as the receiver clock 461. The receiver clock 461 is then used by the S2P converter 122 to capture the incoming data.

While this above discloses the use of a 2.5 GHz memory serdes clock, it can be appreciated that the circuits described herein may be used with clocks having a range of frequencies and the disclosure is not limited to any particular clock frequency.

Note that the digital PLL 450 may be created in a number of ways. In all of these embodiments, the digital PLL 450 has several important characteristics. First, the digital PLL 450 has a persistent memory, such that it retains the value of the optimized delay value 451 even if the reduced frequency clock 26 is disabled for extended periods of time. Second, the digital PLL is able to accurately acquire the optimized delay value 451 in a very small number of data bit transitions. Finally, the digital PLL 450 only consumes power when data bit transitions are occurring.

Figure 6:
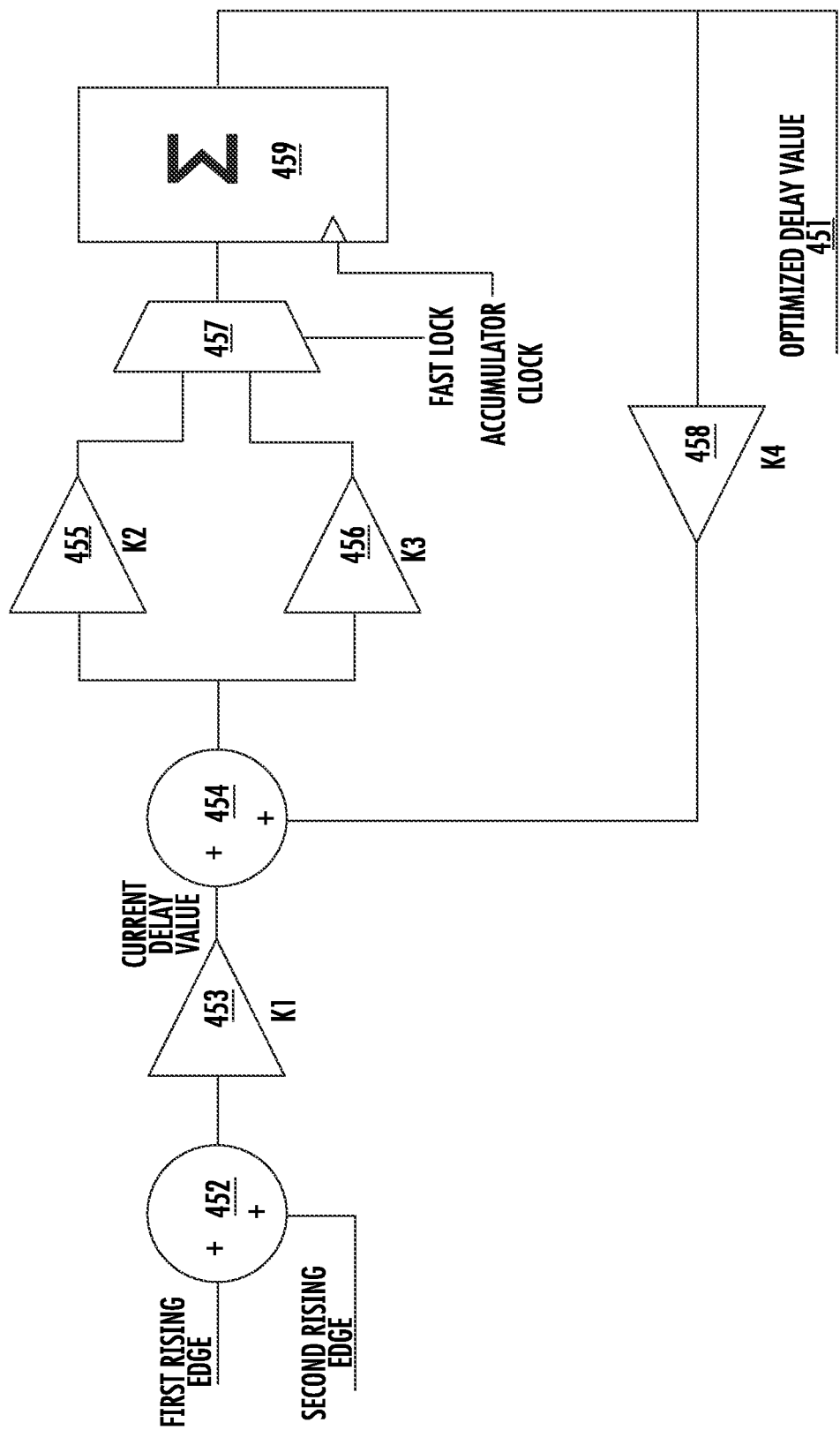
FIG. 6 is a block diagram of a digital PLL used in the clock phase alignment block according to one embodiment.

FIG. 6 shows one embodiment of a digital PLL 450. In this embodiment, the encoder 440 produces two values, a first rising edge and a second rising edge. These values are added together using summing junction 452. The output of summing junction 452 represents twice the average of these values. Next, the output of the summing junction 452 is provided to a first gain stage 453. The first gain stage 453 is used to scale the combined value of the first rising edge and the second rising edge. In some embodiments, this gain (K1) may be ½, which may be achieved by shifting the output of the summing junction 452 to the right one bit. Thus, in one embodiment, the output of the first gain stage 453 is the average of the first rising edge and the second rising edge, which represents the current delay value. In other embodiments, the summing junction 452 and the first gain stage 453 may be combined into a single function. In other embodiments, the first gain stage 453 may be omitted.

The output from the first gain stage 453 (the current delay value) is then provided to a second summing junction 454. Additionally, a scaled version of the output of the accumulator 459, referred to as the optimized delay value 451, is also provided to the second summing junction 454. In one embodiment, optimized delay value 451 is provided to a feedback gain stage 458, which scales the output of the accumulator 459 by a gain K4. In some embodiments, the gain K4 is −1. In this way, the output of the second summing junction 454 is the difference between the optimized delay value 451 and the current delay value. This difference is then supplied as an input to a second gain stage 455, which scales the difference by a gain of K2. This difference may also be supplied as an input to a third gain stage 456, which scales the difference by a gain of K3, which is different from K2. The outputs from the second gain stage 455 and third gain stage 456 are then provided to a multiplexer 457, which selects one of the two outputs. In some embodiments, these two gain stages are used to allow for variable bandwidth. For example, if K2<K3, then the output of the second gain stage 455 will affect the value in the accumulator 459 at a lesser extent than the output of the third gain stage 456. Thus, a larger gain value (i.e. K3) may be used to quickly acquire the optimized delay value 451. However, once it is believed that the optimized delay value 451 is nearly accurate, a lower gain may be used to fine tune the delay value without causing large perturbations in the output of the accumulator 459. A select signal, referred to as fast lock, is used to select which gain stage is used to provide the input to the accumulator 459. In certain embodiments, the fast lock is asserted for a predetermined number of data transitions, such as 10 data transitions, although other numbers of transitions may be employed. Thus, the digital PLL 450 utilizes a high gain mode and a lower gain mode, wherein the high gain mode is utilized for a predetermined number of data transitions to acquire lock.

Finally, the output from the multiplexer 457 is then presented to the accumulator 459. In certain embodiments, the accumulator 459 adds this value to the current value when there is a transition in the data. In other embodiments, the accumulator 459 is clocked using the receiver clock 461 (see FIG. 4). In other embodiments, both signals may be used as the accumulator clock for the accumulator 459. For example, while the fast lock signal is asserted, the accumulator 459 may be clocked for each data transition. Once the fast lock signal is no longer asserted, the accumulator 459 may be clocked using the receiver clock 461.

In other embodiments, two gain stages are not used. Rather, the digital PLL 450 operates using a single gain. In this embodiment, the third gain stage 456 and the multiplexer 457 may be eliminated and the output from the second gain stage 455 is provided directly to the accumulator 459.

As shown in FIG. 4, the output from the accumulator 459 is also supplied to the multiplexer 460 as the optimized delay value 451.

While FIG. 2 shows a single data signal, the architecture described herein may be expanded to accommodate multiple data signals. In one embodiment, the circuitry shown in FIG. 4 may be used to create one phase aligned clock that can be used for the plurality of data signals. Alternatively, in another embodiment, the circuitry shown in FIG. 4 may be replicated for each incoming data signal.

Further, while the above describes the interface as existing between a main processing device and an external nonvolatile memory device, the interface and the circuitry described herein may be applied to any configuration where two devices need to exchange data at high speeds and with low power.

The present system has many advantages. First, by separating the nonvolatile memory from the processor, each may be fabricated using the technology that is best suited for that technology. For example, the processing unit and associated logic may be fabricated in a 22 nm (or smaller) process, while the nonvolatile memory device may be fabricated using a larger geometry, such as 40 nm or 90 nm.

Second, the present system incorporates a high speed interface, operating at up to 2.5 GHz. This allows data to be transmitted from the nonvolatile memory to the main processing device 10 very quickly, minimizing latency and maximizing throughput. This speed supports execution in place (XIP), meaning that the contents of the nonvolatile memory do not need to be replicated in their entirety in the main processing device 10. Rather, the cache in the main processing device 10 is sufficiently large to allow the processing unit 30 to operate at full speed while new data is being retrieved from the external nonvolatile memory.

Further, this interface is designed using CMOS signaling to save quiescent power. To further reduce the power consumed by the interface, the clock that is used by the interface is divided before being transmitted to the external nonvolatile memory device 100. This reduces the power consumed by the clock output buffer. So example, the data may be transmitted at 2.5 GHz, but the clock that is transmitted to the external nonvolatile memory device 100 may be 1.25 GHz or less.

Additionally, the present system utilizes a digital PLL to recreate the clock that is used to clock the incoming data. A digital PLL has a persistent memory, such that it remains synchronized even if the reduced frequency clock 26 is disabled for extended periods of time. Second, the digital PLL is able to accurately acquire the optimized delay value in a very small number of data bit transitions. Finally, the digital PLL only consumes power when data bit transitions are occurring.

Further, in certain embodiments, the main processing device 10 may transmit packets periodically, at a rate that is faster that the rate of temperature drift. In this way, the receiver clock 461 generated by the digital PLL may remain in the middle of the data bit, even as temperature variations occur.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for providing a high speed interface between two devices, comprising:
    a first device having an outgoing data signal, wherein the outgoing data signal is transmitted using a serdes clock, wherein the first device provides a reduced frequency clock, wherein a frequency of the reduced frequency clock is equal to a frequency of the serdes clock divided by an integer;
    a second device to receive the outgoing data signal and the reduced frequency clock from the first device;
    wherein the second device comprises:
    a multiplier in communication with the reduced frequency clock to create a memory serdes clock having a frequency equal to the frequency of the serdes clock;
    a data buffer to receive the outgoing data signal and create an incoming data signal;
    a clock phase alignment block, which utilizes a digital PLL to align a phase of the memory serdes clock with the incoming data signal, wherein the clock phase alignment block comprises a delay line having the memory serdes clock as an input and having a plurality of outputs of different delays, and a sampler, having a plurality of storage elements, a number of storage elements equal to a number of the plurality of outputs of the delay line, wherein each of the plurality of outputs of the delay line are clocked into respective one of the plurality of storage elements of the sampler by a transition of the incoming data signal, wherein a delay through the delay line is greater than or equal to two periods of the memory serdes clock, such that, at each transition of the incoming data signal, the sampler captures at least two rising edges of the memory serdes clock; and
    a serial to parallel converter which clocks the incoming data signal using the memory serdes clock that has been phase aligned.

2. The system of claim 1, wherein the first device comprises:
    a data input buffer to receive a data signal from the second device and create a received data signal;
    a second clock phase alignment block, which utilizes a second digital PLL to align a phase of the serdes clock with the received data signal; and
    a second serial to parallel converter which clocks the received data signal using the serdes clock that has been phase aligned.

3. The system of claim 2, wherein the outgoing data signal and the reduced frequency clock comprise single-ended CMOS signals.

4. The system of claim 2, wherein the integer is 2; and wherein the multiplier utilizes combinational logic to create the memory serdes clock.

5. The system of claim 2, wherein the frequency of the serdes clock is greater than 1 GHz.

6. The system of claim 1, wherein the digital PLL has a high gain mode and a lower gain mode.

7. The system of claim 6, wherein the high gain mode is used to acquire lock and has a duration equal to a predetermined number of transitions of the incoming data signal.

8. The system of claim 1, wherein locations of the at least two rising edges of the memory serdes clock within the plurality of storage elements in the sampler are used as inputs to the digital PLL.

9. A device, comprising:
    an interface having a data signal and a reduced frequency clock, wherein the data signal has a frequency that is a multiple of the reduced frequency clock;
    a multiplier in communication with the reduced frequency clock to create a memory serdes clock having a frequency equal to a frequency of the data signal;
    a data buffer to receive the data signal and create an incoming data signal;
    a clock phase alignment block, which utilizes a digital PLL to align a phase of the memory serdes clock with the incoming data signal, wherein the clock phase alignment block comprises a delay line having the memory serdes clock as an input and having a plurality of outputs of different delays, and a sampler, having a plurality of storage elements, a number of storage elements equal to a number of the plurality of outputs of the delay line, wherein each of the plurality of outputs of the delay line are clocked into respective one of the plurality of storage elements of the sampler by a transition of the incoming data signal, wherein a delay through the delay line is greater than or equal to two periods of the memory serdes clock, such that, at each transition of the incoming data signal, the sampler captures at least two rising edges of the memory serdes clock; and a serial to parallel converter which clocks the incoming data signal using the memory serdes clock that has been phase aligned.

10. The device of claim 9, wherein the digital PLL has a high gain mode and a lower gain mode.

11. The device of claim 10, wherein the high gain mode is used to acquire lock and has a duration equal to a predetermined number of transitions of the incoming data signal.

12. The device of claim 9, wherein locations of the at least two rising edges of the memory serdes clock within the plurality of storage elements in the sampler are used as inputs to the digital PLL.

13. The device of claim 9, wherein the multiple is 2; and wherein the multiplier utilizes combinational logic to create the memory serdes clock.

14. The device of claim 9, wherein the data signal and the reduced frequency clock comprise single-ended CMOS signals.

15. The device of claim 9, wherein the frequency of the reduced frequency clock is greater than 1 GHz.

16. A device, comprising:
an interface having a data signal and a reduced frequency clock, wherein the data signal has a frequency that is a multiple of the reduced frequency clock;
a multiplier in communication with the reduced frequency clock to create a memory serdes clock having a frequency equal to a frequency of the data signal;
a data buffer to receive the data signal and create an incoming data signal;
a clock phase alignment block, which utilizes a digital PLL to align a phase of the memory serdes clock with the incoming data signal, wherein the digital PLL has a high gain mode and a lower gain mode and wherein the high gain mode is used to acquire lock and has a duration equal to a predetermined number of transitions of the incoming data signal; and
a serial to parallel converter which clocks the incoming data signal using the memory serdes clock that has been phase aligned.

17. The device of claim 16, wherein the multiple is 2; and wherein the multiplier utilizes combinational logic to create the memory serdes clock.

18. The device of claim 16, wherein the data signal and the reduced frequency clock comprise single-ended CMOS signals.

19. The device of claim 16, wherein the frequency of the reduced frequency clock is greater than 1 GHz.

* * * * *